United States Patent
Lai et al.

(10) Patent No.: US 8,396,099 B2
(45) Date of Patent: Mar. 12, 2013

(54) MULTI-CARRIER RECEIVER, MULTI-CARRIER TRANSMITTER AND MULTI-CARRIER TRANSCEIVER SYSTEM

(75) Inventors: Chang-Ming Lai, Chiayi (TW); Ping-Hsun Wu, Kaohsiung (TW); Jian-Yu Li, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 236 days.

(21) Appl. No.: 12/889,417

(22) Filed: Sep. 24, 2010

(65) Prior Publication Data

US 2012/0044975 A1 Feb. 23, 2012

(30) Foreign Application Priority Data

Aug. 19, 2010 (TW) ................................ 99127785 A

(51) Int. Cl.
*H04L 27/00* (2006.01)
*H04L 27/28* (2006.01)

(52) U.S. Cl. ......... 375/219; 375/316; 375/340; 375/295

(58) Field of Classification Search .................. 375/219, 375/316, 340, 295, 260
See application file for complete search history.

(56) References Cited

U.S. PATENT DOCUMENTS

| | | | |
|---|---|---|---|
| 6,563,859 B1 | 5/2003 | Oishi et al. | |
| 6,584,304 B1* | 6/2003 | Thomsen et al. | 455/188.1 |
| 7,046,716 B1* | 5/2006 | Miao | 375/130 |
| 7,127,269 B2* | 10/2006 | Shih | 455/552.1 |
| 7,133,646 B1* | 11/2006 | Miao | 455/73 |
| 7,209,720 B2* | 4/2007 | Balasubramaniyan et al. | 455/127.5 |
| 7,242,707 B1* | 7/2007 | Miao | 375/130 |
| 7,263,133 B1* | 8/2007 | Miao | 375/267 |
| 7,305,057 B1* | 12/2007 | Miao | 375/350 |
| 7,403,508 B1* | 7/2008 | Miao | 370/335 |
| 7,424,271 B2* | 9/2008 | Shih et al. | 455/76 |
| 7,433,382 B1* | 10/2008 | Miao | 375/141 |
| 7,466,975 B2* | 12/2008 | Feher | 455/404.2 |
| 7,564,910 B2 | 7/2009 | Kostic | |
| 7,567,625 B2* | 7/2009 | Oh et al. | 375/299 |
| 7,650,133 B2* | 1/2010 | Miura et al. | 455/341 |
| 7,660,361 B2 | 2/2010 | Sakoda | |
| 7,676,244 B2* | 3/2010 | Park et al. | 455/552.1 |
| 7,720,488 B2* | 5/2010 | Feher | 455/456.1 |
| 7,848,458 B2* | 12/2010 | Ochiai et al. | 375/316 |
| 7,991,013 B2* | 8/2011 | Gupta et al. | 370/481 |
| 8,098,625 B2* | 1/2012 | Miyano et al. | 370/330 |
| 8,107,520 B2* | 1/2012 | Kawano | 375/230 |
| 2004/0233836 A1 | 11/2004 | Sumasu et al. | |
| 2005/0094714 A1 | 5/2005 | Robinson | |

(Continued)

*Primary Examiner* — David C. Payne
*Assistant Examiner* — Bahman Badipour
(74) *Attorney, Agent, or Firm* — Jianq Chyun IP Office

(57) ABSTRACT

A multi-carrier receiver, multi-carrier transmitter and a multi-carrier transceiver system are provided. The multi-carrier receiver includes at least a first processing unit, a routed switch and a second processing unit. The first processing unit has M first processing paths, performs intensity processing to at least one RF signal for outputting sub-carrier signals. The routed switch has M input terminals and N output terminals, where the M input terminals are respectively coupled to the M first processing paths and receive the sub-carrier signals. The routed switch connects each input terminal to at least one output terminal or none of the output terminals according to a control signal. The second processing unit has N second processing paths respectively coupled to the N output terminals for demodulating the sub-carrier signals and performing an analog-to-digital conversion to the demodulated signals for generating digital signals, where M and N are greater than 0.

22 Claims, 13 Drawing Sheets

U.S. PATENT DOCUMENTS

| | | | |
|---|---|---|---|
| 2005/0180515 A1* | 8/2005 | Orihashi et al. | 375/260 |
| 2007/0243832 A1* | 10/2007 | Park et al. | 455/73 |
| 2008/0013654 A1 | 1/2008 | Rick et al. | |
| 2008/0045154 A1* | 2/2008 | Wu | 455/65 |
| 2008/0292009 A1* | 11/2008 | Deng et al. | 375/260 |
| 2009/0093270 A1* | 4/2009 | Block et al. | 455/552.1 |
| 2009/0141830 A1* | 6/2009 | Ye | 375/320 |
| 2009/0156135 A1* | 6/2009 | Kamizuma et al. | 455/73 |
| 2009/0279588 A1* | 11/2009 | Mochizuki | 375/137 |
| 2010/0128676 A1* | 5/2010 | Wu et al. | 370/328 |
| 2010/0291884 A1* | 11/2010 | Hu et al. | 455/101 |
| 2010/0291963 A1* | 11/2010 | Patel et al. | 455/522 |
| 2011/0044376 A1* | 2/2011 | Lin et al. | 375/130 |
| 2011/0122972 A1* | 5/2011 | Lie et al. | 375/316 |
| 2011/0210784 A1* | 9/2011 | Lee | 327/536 |
| 2011/0210787 A1* | 9/2011 | Lee et al. | 330/126 |

* cited by examiner

MULTI-CARRIER RECEIVER, MULTI-CARRIER TRANSMITTER AND MULTI-CARRIER TRANSCEIVER SYSTEM

CROSS-REFERENCE TO RELATED APPLICATION

This application claims the priority benefit of Taiwan application serial no. 99127785, filed on Aug. 19, 2010. The entirety of the above-mentioned patent application is hereby incorporated by reference herein and made a part of this specification.

BACKGROUND

1. Field of the Disclosure

The disclosure relates to a multi-carrier receiver, a multi-carrier transmitter and a multi-carrier transceiver system.

2. Description of Related Art

Currently, wireless broadband communication technology generally uses a carrier aggregation technique to improve a spectrum efficiency of limited frequency resources and enhance data transmission capability. In the carrier aggregation technique, data required to be transmitted is distributed to sub-carriers with relatively smaller bandwidths. Since a present spectrum distribution approach limits availability of a continuously large band, in the carrier aggregation technique, the sub-carriers can be contiguous, non-contiguous or even inter-band allocation.

In an application of the carrier aggregation technique, a radio frequency (RF) transceiver system must simultaneously transmit a plurality of signals, and a common implementation thereof is to use a plurality of RF transceivers, and suitably design a bandwidth required by each RF transceiver. FIG. 1 is a functional block diagram illustrating a conventional multi-carrier receiver 100. For simplicity of illustration, only two analog signal processing paths are schematically illustrated in FIG. 1 for processing signals of two bands and transmitting processed signals to a digital signal processor 150 for further processing. A first analog signal processing path in the multi-carrier receiver 100 receives a RF signal from an antenna, and performs signal gain processing and frequency down-conversion processing to one or a plurality of sub-carrier signals of a first band (band 1) sequentially through an amplifier 110, a mixer 120 and a local oscillator 130. After the sub-carrier signals are down-converted, a filter 142 in an analog signal processing unit 140 filters noises not belonging to a predetermined bandwidth from the sub-carrier signals, and a demodulator 144 demodulates the sub-carrier signals. Then, the demodulated sub-carrier signals are converted into digital signals by an analog-to-digital converter (ADC) 146, and the digital signals are transmitted to the digital signal processor 150 for further processing. Similarly, in a second analog signal processing path of the multi-carrier receiver 100, components such as an amplifier 160, a mixer 170, a local oscillator 180, and a filter 192, a demodulator 194 and an ADC 196 in an analog signal processing unit 190 that are symmetrical to that of the first analog signal processing path are used to process one or a plurality of sub-carrier signals of a second band (band 2) according to the same processing method as described for the first analog signal processing path, and the processed signal is transmitted to the digital signal processor 150 for further processing.

The first and the second analog signal processing paths in the multi-carrier receiver 100 all preserve the maximum bandwidth (for example, the ADCs and the filters) in hardware design. It is noted that a bandwidth requirement of the ADC is not only a sum of bandwidths of all of the sub-carriers, but frequency differences of sub-carrier frequencies are also simultaneously taken into consideration, so that the RF signals can be linearly converted into digital signals, so as to maintain signal qualities of the converted sub-carrier signals. If the frequency differences of the sub-carrier frequencies are relatively greater or in case of the inter-band distribution, channel fading of the sub-carriers are different, so that the ADC is required to have relatively greater dynamic range. However, during practical operations, the received sub-carriers may not be evenly distributed to the two analog signal processing paths, and this situation causes a waste of the hardware circuit and power consumption.

Regarding other techniques for processing multi-carrier signals, the RF signal is generally converted into the digital signal, and then digital filtering processing is performed, so as to implement a multi-carrier transceiver capable of simultaneously processing a plurality of non-contiguous sub-carriers. However, these conventional multi-carrier signal processing methods still require ADCs of high complexity and high hardware cost, and meanwhile bandwidth requirements thereof are also very high. Therefore, in a multi-carrier transceiver capable of simultaneously processing a plurality of non-contiguous sub-carriers, it is an important issue to reduce complexity and hardware cost of the overall multi-carrier transceiver system.

SUMMARY OF THE DISCLOSURE

An exemplary embodiment of the disclosure provides a multi-carrier receiver including a first signal processing unit, a routed switch and a second signal processing unit. The first signal processing unit has M first signal processing paths, and performs a first signal processing to at least one radio frequency (RF) signal for outputting at least one sub-carrier signal, where M is greater than 0. The routed switch has M input terminals and N output terminals, where the M input terminals are respectively coupled to the M first signal processing paths of the first signal processing unit for receiving the at least one sub-carrier signal. The routed switch connects each input terminal to at least one output terminal or none of the output terminals according to a control signal, where N is greater than 0. The second signal processing unit has N second signal processing paths respectively coupled to the N output terminals of the routed switch for performing a second signal processing to the at least one sub-carrier signal and outputting at least one digital signal.

An exemplary embodiment of the disclosure provides a multi-carrier transmitter including a first signal processing unit, a routed switch and a second signal processing unit. The first signal processing unit has K first signal processing paths, and performs a first signal processing to at least one digital signal for outputting at least one sub-carrier signal, where K is greater than 0. The routed switch has K input terminals and L output terminals, where the K input terminals are respectively coupled to the K first signal processing paths of the first signal processing unit for receiving the at least one sub-carrier signal. The routed switch connects each input terminal to at least one output terminal or none of the output terminals according to a control signal, where L is greater than 0. The second signal processing unit has L second signal processing paths respectively coupled to the L output terminals of the routed switch for performing a second signal processing to the at least one sub-carrier signal and outputting at least one RF signal.

An exemplary embodiment of the disclosure provides a multi-carrier transceiver system including a multi-carrier receiver and a multi-carrier transmitter. The multi-carrier receiver includes a first signal processing unit, a first routed switch and a second signal processing unit. The first signal processing unit has M first signal processing paths, and performs a first signal processing to at least one first RF signal for outputting at least one first sub-carrier signal, where M is greater than 0. The first routed switch has M input terminals and N output terminals, where the M input terminals are respectively coupled to the M first signal processing paths of the first signal processing unit for receiving the at least one first sub-carrier signal. The first routed switch connects each input terminal to at least one output terminal or none of the output terminals according to a first control signal, where N is greater than 0 The second signal processing unit has N second signal processing paths respectively coupled to the N output terminals of the first routed switch for performing a second signal processing to the at least one first sub-carrier signal and outputting at least one first digital signal. The multi-carrier transmitter transmits at least one second sub-carrier signal.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 2:
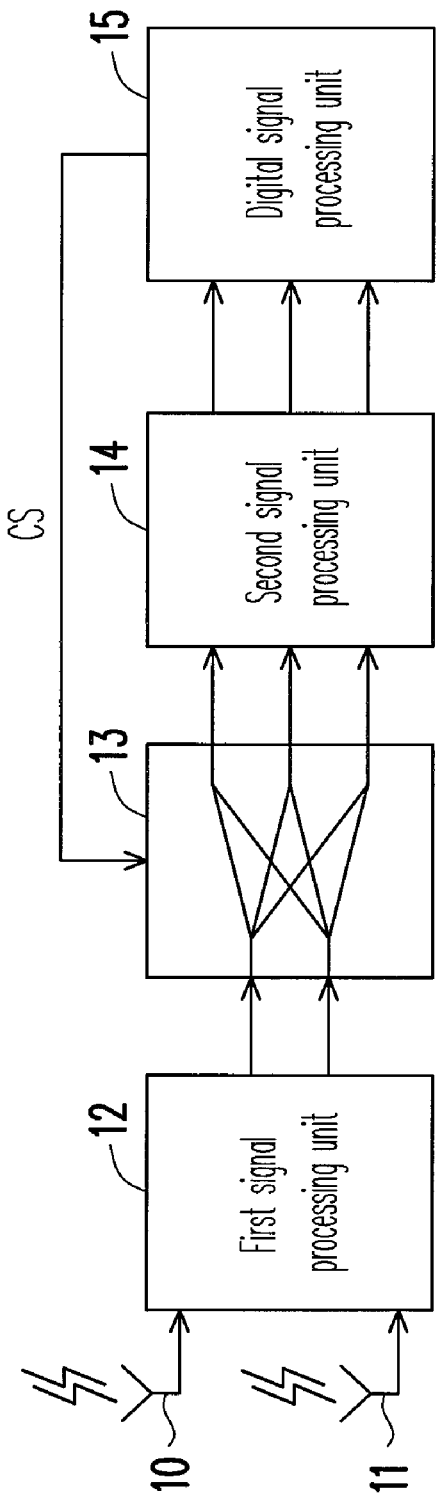
FIG. 2 is a system structural diagram illustrating a multi-carrier receiver according to a first exemplary embodiment of the disclosure.

FIG. 2 is a system structural diagram illustrating a multi-carrier receiver 200 according to a first exemplary embodiment of the disclosure. Referring to FIG. 2, the multi-carrier receiver 200 includes an antenna 10 and an antenna 11, a first signal processing unit 12, a routed switch 13, a second signal processing unit 14 and a digital signal processing unit 15.

Referring to FIG. 2, the multi-carrier receiver 200 receives one or a plurality of radio frequency (RF) signals of two bands from the antenna 10 and the antenna 11, where the RF signal includes one or a plurality of sub-carrier signals. For example, the multi-carrier receiver 200 receives the RF signal from a transmitter, and the transmitter aggregates one or a plurality of sub-carriers or carrier components into one RF signal through a carrier aggregation technique. The RF signal may include one or a plurality of sub-carrier signals of a first band (for example, 1.8 GHz), or include one or a plurality of sub-carrier signals of a second band (for example, 2.1 GHz). Moreover, the transmitter may dynamically adjust the carrier aggregation technique for aggregating the one or a plurality of sub-carrier signals, and the sub-carriers can be non-contiguous. For example, during a time interval, the RF signal can only include one sub-carrier signal of the first band, and simultaneously include two sub-carrier signals of the second band, while during another time interval, the RF signal can only include three sub-carrier signals (the three sub-carrier signals can be non-contiguous) of the first band, and simultaneously include none of sub-carrier signals of the second band. In the present exemplary embodiment, a bandwidth of the sub-carrier or the carrier component is assumed to be 20 MHz, the RF signal aggregated according to the carrier aggregation technique is then a triple of 20 MHz, i.e. 60 MHz. However, the disclosure is not limited thereto, and the bandwidth of the sub-carrier or the carrier component can be different to 20 MHz, which can be, for example, 5 MHz, 10 MHz or 15 MHz.

The first signal processing unit 12 performs signal processing (for example, signal filtering or signal intensity processing) to the one or a plurality of the received sub-carrier signals through M parallel signal processing paths, where M is greater than 0. The routed switch 13 is coupled to the first signal processing unit 12 and the second signal processing unit 14, and receives a control signal CS from the digital signal processing unit 15. The first signal processing unit 12 receives one or a plurality of the sub-carrier signals on two signal paths. However, the disclosure is not limited thereto, and in other embodiments of the disclosure, the first signal processing unit 12 can further down-convert a frequency of at least one RF signal to output an intermediate frequency signal.

In the exemplary embodiment, the routed switch 13 is a signal path switching device having M input terminals and N output terminals, where M and N are greater than 0. Referring to FIG. 2, in the multi-carrier receiver 200, M is 2 and N is 3. The routed switch 13 switches the sub-carrier signals on each signal processing path to any one of the output terminals, multiple output terminals or none of the output terminals according to the control signal CS. In other words, the routed switch 13 connects each of the input terminals coupled to the first signal processing paths to any one of the output terminals, multiple output terminals or none of the output terminals according to the control signal CS.

The digital signal processing unit 15 can obtain information of the sub-carriers aggregated according to the carrier aggregation technique by receiving an upper-layer communication protocol signalling transmitted by a base station, and generate the control signal CS according to the information of the sub-carriers, so as to notify the routed switch 13 to suitably switch the signal processing paths. The sub-carriers on each one of the signal processing paths can be contiguous, non-contiguous or inter-band. Moreover, the sub-carriers used for transmitting data can be dynamically varied.

Referring to FIG. 2, the second signal processing unit 14 is coupled to the routed switch 13 and the digital signal processing unit 15. The second signal processing unit 14 receives the sub-carrier signals from the N output terminals of the routed switch 13, and performs demodulation processing and analog-to-digital conversions to the sub-carrier signals. The second signal processing unit 14 can further perform signal filtering, signal intensity enhancement (or voltage gain) processing to the sub-carrier signals. The sub-carrier signals converted into a digital format are transmitted to the digital signal processing unit 15 for further processing.

The disclosure is not limited to the first exemplary embodiment, and in other embodiments of the disclosure, the multi-carrier receiver can only include one antenna, and the first signal processing unit 12 can receive one or a plurality of sub-carrier signals of two bands from the single antenna. Moreover, in other embodiments of the disclosure, M can be any integer different to 2 and greater than 0, and N can be any integer different to 3 and greater than 0. After the system structure of the multi-carrier receiver 200 is introduced, detailed circuit technical features of the multi-carrier receiver are introduced below with reference of FIG. 3A-FIG. 3C.

Figure 3A:
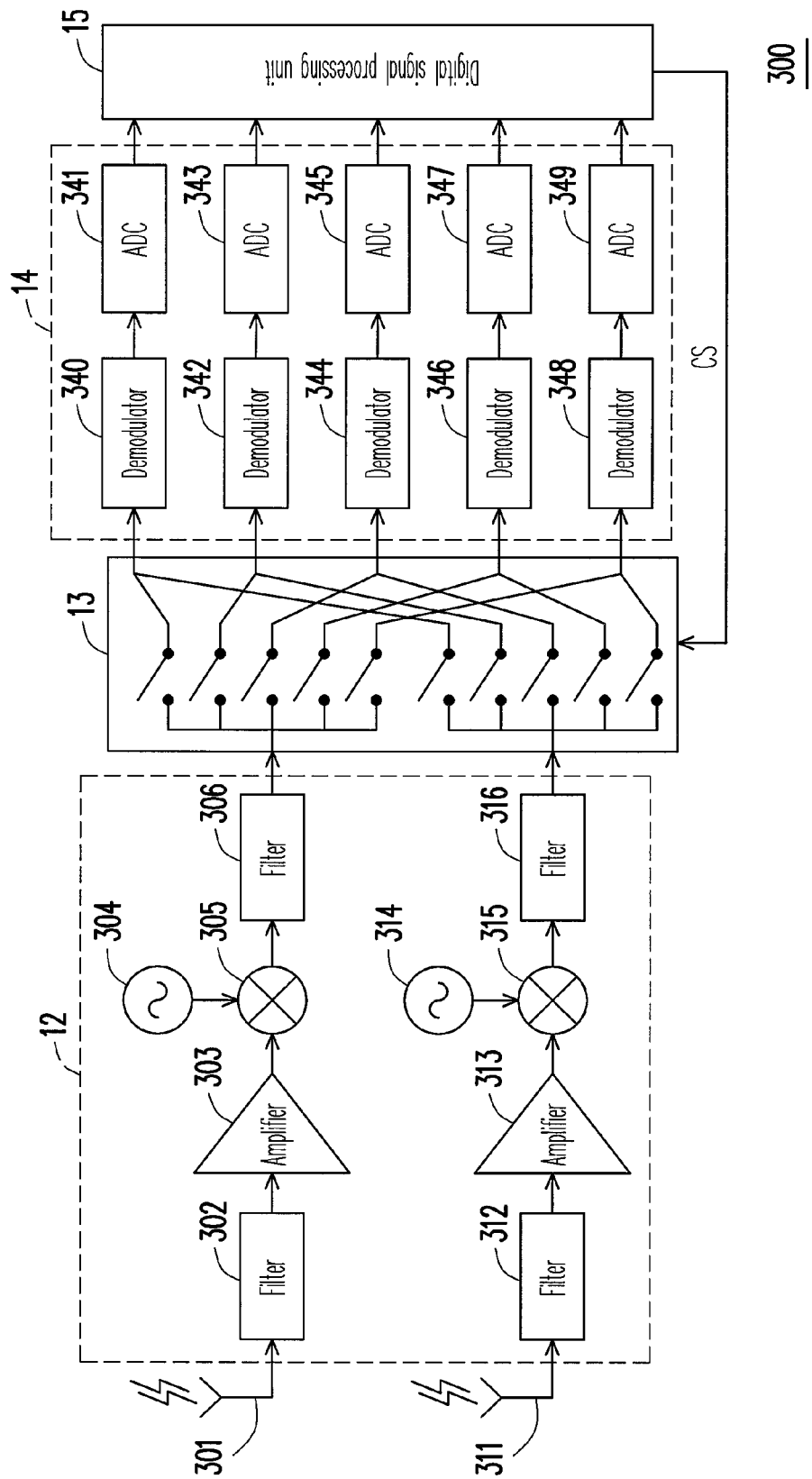
FIG. 3A is a system structural diagram illustrating a multi-carrier receiver according to a second exemplary embodiment of the disclosure.

FIG. 3A is a system structural diagram illustrating a multi-carrier receiver 300 according to a second exemplary embodiment of the disclosure. The multi-carrier receiver 300 is similar to the multi-carrier receiver 200, and the multi-carrier receiver 300 includes an antenna 301 and an antenna 311, the first signal processing unit 12, the routed switch 13, the second signal processing unit 14 and the digital signal processing unit 15. In the second exemplary embodiment, the first signal processing unit 12 is coupled to the antenna 301 and an antenna 311 for receiving one or a plurality of RF signals of two bands, where each one of the RF signals can include one or a plurality of sub-carrier signals. Moreover, the first signal processing unit 12 can process the received one or a plurality of the sub-carrier signals through two independent and parallel signal processing paths. In detail, the first signal processing unit 12 has a first signal processing path including a filter 302, an amplifier 303, an oscillator 304, a mixer 305 and a filter 306. The filter 302 filters noises and other RF signals that are not belonging to the first band (for example, 1.8 GHz), and the amplifier 303 performs signal intensity enhancement (or voltage gain) processing to the one or a plurality of the RF signals of such band. The mixer 305 receives the enhanced RF signal and down-converts a frequency of the enhanced RF signal (which is, for example, originally in a band of 1.8 GHz) to generate an intermediate frequency signal (for example, in a band of 500 MHz) according to a frequency signal provided by the oscillator 304. The down-converted RF signal (i.e., the intermediate frequency signal) still includes one or a plurality of sub-carrier signals. The filter 306 further filters the noises of the down-converted RF signal that are not belonging to the intermediate frequency band (for example, 500 MHz), and outputs the down-converted RF signal to the routed switch 13.

Referring to FIG. 3A, the first signal processing unit 12 further has a second signal processing path including a filter 312, an amplifier 313, an oscillator 314, a mixer 315 and a filter 316. The filter 312, the amplifier 313, the oscillator 314, the mixer 315 and the filter 316 in the second signal processing path sequentially processing the RF signals of the second band (for example, 2.1 GHz) that are received from the antenna 311 according to processing methods similar to that of the filter 302, the amplifier 303, the oscillator 304, the mixer 305 and the filter 306, so as to filter, enhance and down-convert the RF signals, and output the down-converted sub-carrier signals to the routed switch 13.

The routed switch 13 selects to output the sub-carrier signals of each one of the input terminals to one of the output terminals, multiple output terminals or none of the output terminals according to the control signal CS provided by the digital signal processing unit 15. Referring to FIG. 3A, in the second exemplary embodiment, the routed switch 13 has M input terminals and N output terminals, where M is 2 and N is 5. For example, if the sub-carriers aggregated by the transmitter according to the carrier aggregation technique are all in the first band, i.e., only the RF signals in the first signal processing path have the sub-carriers, the routed switch 13 switches the first input terminal connected to the first signal processing path to a plurality of output terminals according to the control signal CS. Since there is no sub-carrier in the second band, the routed switch 13 does not switch the second input terminal connected to the second signal processing path to any of the output terminals according to the control signal CS.

Moreover, according to FIG. 3A, it is known that a number of the signal processing paths of the first signal processing unit 12 determines a total number of the input terminals of the routed switch 13, and a number of signal processing paths (five signal processing paths are illustrated in FIG. 3A) of the second signal processing unit 14 determines a total number of the output terminals of the routed switch 13. For example, if two of the sub-carriers aggregated by the transmitter according to the carrier aggregation technique are in the first band, and three other sub-carriers are in the second band, the routed switch 13 can switch the first input terminal connected to the first signal processing path to two output terminals and switch the second input terminal connected to the second signal processing path to three output terminals according to the control signal CS.

In the second exemplary embodiment, the second signal processing unit 14 includes five parallel signal processing paths, which are respectively coupled to the output terminals of the routed switch 13 for processing the received sub-carrier signals. A first signal processing path of the second signal processing unit 14 includes a demodulator 340 and an analog-to-digital converter (ADC) 341. The demodulator 340 demodulates the sub-carrier signal, and transmits the demodulated analog signal to the ADC 341 for converting it into a digital signal (or digital domain), and then the digital signal is transmitted to the digital signal processing unit 15 for further processing. Since the digital signal processing is not a technical main point of the disclosure, and those skilled in the art have already known the follow-up steps of the digital signal processing, a detailed operation of the digital signal processing unit 15 is not described herein.

Similar to the processing methods of the demodulator 340 and the ADC 341, the other parallel signal processing paths of the second signal processing unit 14, for example, a demodulator 342 and an ADC 343 of a second signal processing path, a demodulator 344 and an ADC 345 of a third signal processing path, a demodulator 346 and an ADC 347 of a fourth signal processing path, and a demodulator 348 and an ADC 349 of a fifth signal processing path may demodulate different sub-carrier signals, and convert the demodulated analog signals into digital signals, and transmit the digital signals to the digital processing unit 15 for further processing. Moreover, since the five parallel signal processing paths of the second signal processing unit 14 are mutually independent, the signal processing paths can perform different signal intensity enhancement processing to different sub-carrier signals, so as to balance different channel fading effects of the sub-carrier signals.

Figure 3B:
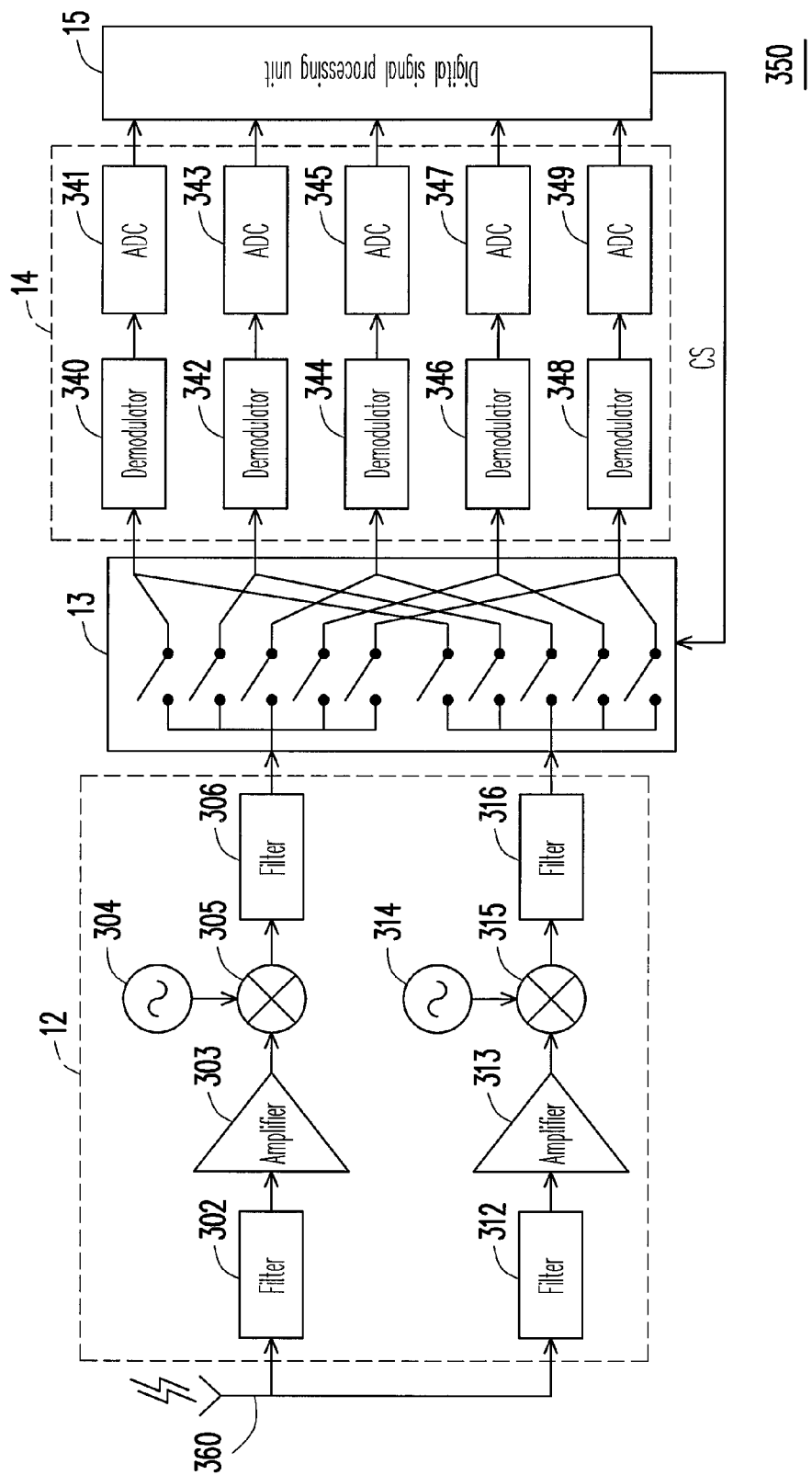
FIG. 3B is a system structural diagram illustrating a multi-carrier receiver according to a third exemplary embodiment of the disclosure.

FIG. 3B is a system structural diagram illustrating a multi-carrier receiver 350 according to a third exemplary embodiment of the disclosure. The multi-carrier receiver 350 is similar to the multi-carrier receiver 300, and a difference therebetween is that the multi-carrier receiver 350 just has one antenna 360, and the antenna 360 has a bandwidth equal to a total bandwidth of the antenna 301 and the antenna 311, so that the two parallel signal processing paths of the first signal processing unit 12 of the third exemplary embodiment are all connected to the antenna 360, and receive the RF signals of two bands from the antenna 360. However, the disclosure is not limited thereto, and in other embodiments of the disclosure, the multi-carrier receiver can receive RF signals of more than two bands from one antenna.

Figure 3C:
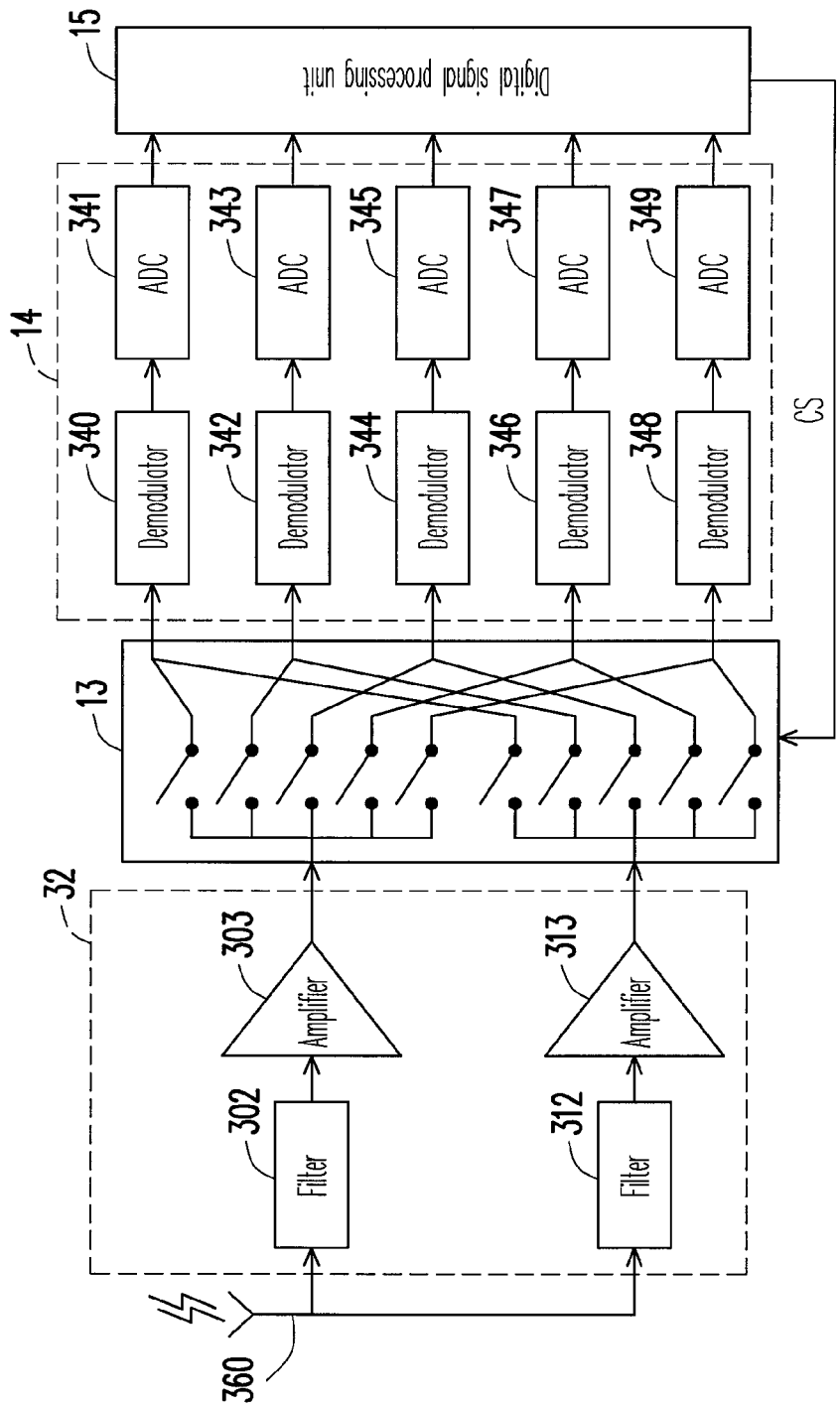
FIG. 3C is a system structural diagram illustrating a multi-carrier receiver according to a fourth exemplary embodiment of the disclosure.

FIG. 3C is a system structural diagram illustrating a multi-carrier receiver 370 according to a fourth exemplary embodiment of the disclosure. The multi-carrier receiver 370 is similar to the multi-carrier receiver 350, and a difference therebetween is that each one of first signal processing paths of a first signal processing unit 32 of the multi-carrier receiver 370 does not include the oscillator 304, the mixer 305, the filter 306, the oscillator 314, the mixer 315 and the filter 316. In other words, each one of the first signal processing paths of the first signal processing unit 32 does not use the mixer 305 and the mixer 315 to perform the down conversion processing to the at least one received RF signal. In the fourth exemplary embodiment, each demodulator (for example, the demodulator 340, 342, 344, 346 or 348) of the second signal processing unit 14 can demodulate each of the received RF signals. After detailed components and functions of the components of the multi-carrier receiver are introduced, technical details of a multi-carrier transmitter are introduced below with reference of FIG. 4, FIG. 5A-FIG. 5C.

Figure 4:
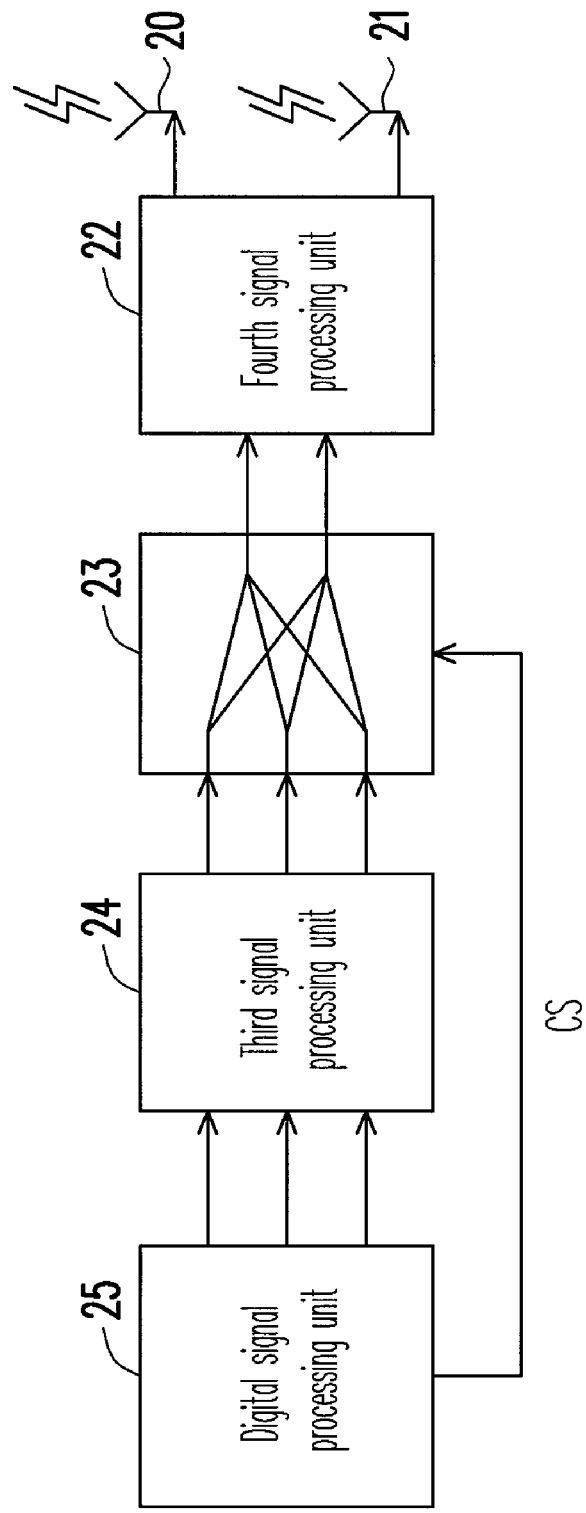
FIG. 4 is a system structural diagram illustrating a multi-carrier transmitter according to a fifth exemplary embodiment of the disclosure.

FIG. 4 is a system structural diagram illustrating a multi-carrier transmitter 400 according to a fifth exemplary embodiment of the disclosure. The multi-carrier transmitter 400 includes a digital signal processing unit 25, a third signal processing unit 24, a routed switch 23, a fourth signal processing unit 22, an antenna 20 and an antenna 21. The digital signal processing unit 25 of the multi-carrier transmitter 400 is coupled to the third signal processing unit 24, and transmits digital signals (information of digital domain) to the third signal processing unit 24. The third signal processing unit 24 converts the digital signals into analog signals, and modulates the analog signals into sub-carrier signals. The routed switch 23 is coupled to the third signal processing unit 24 and the fourth signal processing unit 22, and switches each one of input terminals of the routed switch 23 to one of output terminals, multiple terminals or none of the output terminals according to the control signal CS provided by the digital signal processing unit 25.

Based on the operation of the routed switch 23, the multi-carrier transmitter 400 can aggregate one or a plurality of sub-carriers or carrier components into one RF signal according to the carrier aggregation technique, and transmit it to any of signal processing paths of the fourth signal processing unit 22. Referring to FIG. 4, the RF signal can include one or a plurality of sub-carrier signals of a first band (for example, 1.8 GHz) and one or a plurality of sub-carrier signals of a second band (for example, 2.1 GHz). Moreover, the multi-carrier transmitter 400 can dynamically adjust the method for aggregating the one or a plurality of sub-carrier signals, and the sub-carriers can be non-contiguous. For example, during a time interval, the RF signal can only include one sub-carrier signal of the first band, and simultaneously include two sub-carrier signals of the second band, while during another time interval, the RF signal can only include three sub-carrier signals (the three sub-carrier signals can be non-contiguous) of the first band, and simultaneously include none of sub-carrier signals of the second band. In the fifth exemplary embodiment, a bandwidth of the sub-carrier or the carrier component is 20 MHz, and the RF signal aggregated according to the carrier aggregation technique is a triple of 20 MHz, 60 MHz. However, the disclosure is not limited thereto, and the bandwidth of the sub-carrier or the carrier component can be different to 20 MHz, which can be, for example, 5 MHz, 10 MHz or 15 MHz.

Referring to FIG. 4, the fourth signal processing unit 22 is coupled to the routed switch 23 and the antenna 20 and the antenna 21 for receiving the RF signal output by the routed switch 23. The fourth signal processing unit 22 performs filtering processing and signal intensity processing to the RF signal, and transmits it to the antenna 20 and the antenna 21 for transmitting to a receiver. After the system structure of the multi-carrier transmitter 400 is introduced, detailed circuit technical features of the multi-carrier transmitter are introduced below with reference of FIG. 5A-FIG. 5C.

Figure 5A:
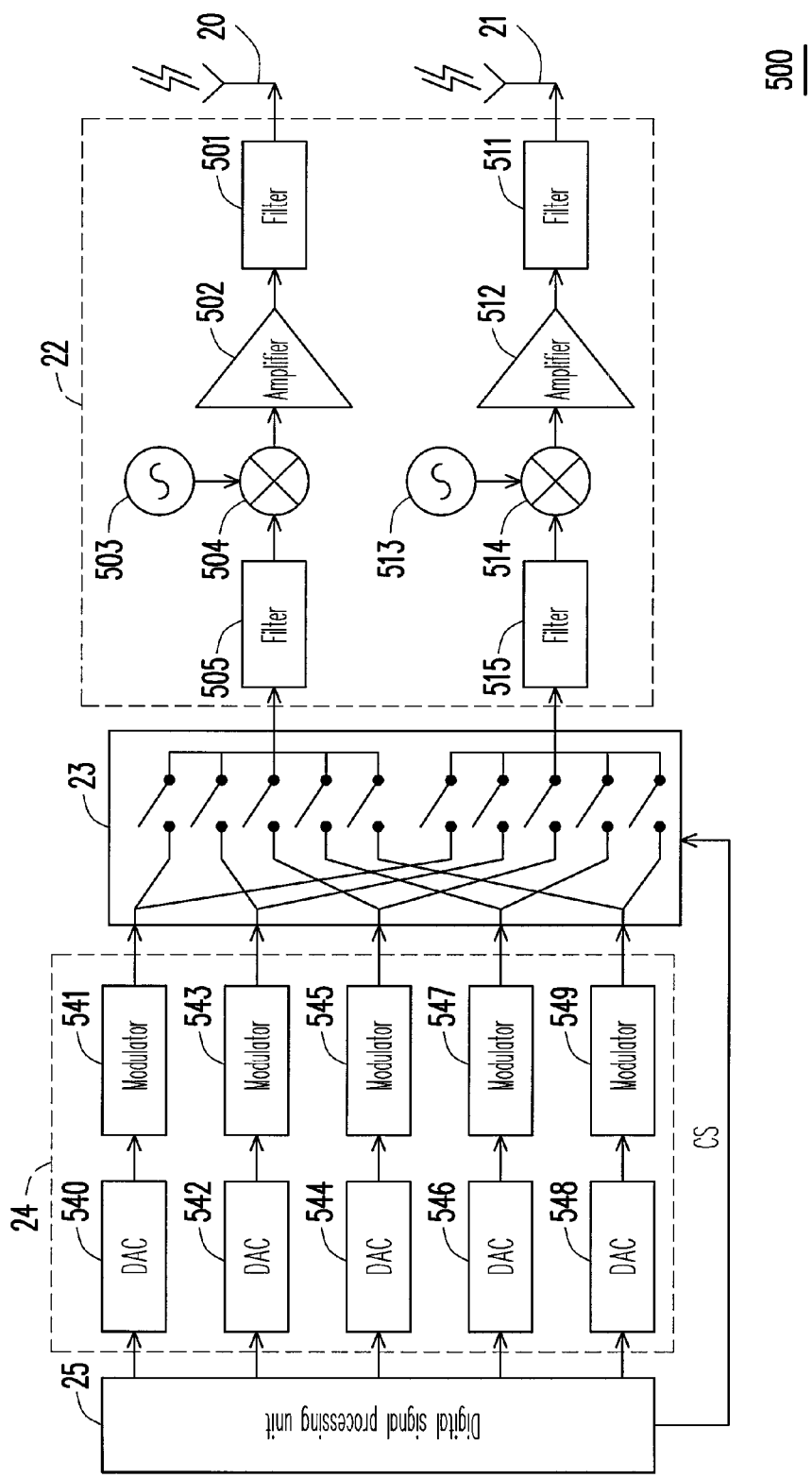
FIG. 5A is a system structural diagram illustrating a multi-carrier transmitter according to a sixth exemplary embodiment of the disclosure.

FIG. 5A is a system structural diagram illustrating a multi-carrier transmitter 500 according to a sixth exemplary embodiment of the disclosure. The multi-carrier transmitter 500 is similar to the multi-carrier transmitter 400, and the multi-carrier transmitter 500 includes the digital signal processing unit 25, the third signal processing unit 24, the routed switch 23, the fourth signal processing unit 22, the antenna 20 and the antenna 21. The third signal processing unit 24 includes five parallel signal processing paths for respectively receiving the digital signal output of the digital signal processing unit 25, and processing the received digital signal information. A first signal processing path of the third signal processing unit 24 includes a digital-to-analog converter (DAC) 540 and a modulator 541. The DAC 540 converts the digital signal (or information of digital domain) into an analog signal, and transmits it to the modulator 541, so as to modulate the analog signal into the sub-carrier signals.

Referring to FIG. 5A, similar to the processing methods of the DAC 540 and the modulator 541, the other parallel signal processing paths of the third signal processing unit 24, for example, a DAC 542 and a modulator 543 of a second signal processing path, a DAC 544 and a modulator 545 of a third signal processing path, a DAC 546 and a modulator 547 of a fourth signal processing path, and a DAC 548 and a modulator 549 of a fifth signal processing path can convert different digital signals into analog signals, and modulate the analog signals into sub-carrier signals for outputting to the routed switch 23 for further processing. Moreover, since the five parallel signal processing paths of the third signal processing unit 24 are mutually independent, the signal processing paths can perform different signal enhancement processing to different sub-carrier signals, so as to balance different channel fading effects probably occurred to the sub-carrier signals after the sub-carrier signals are sent by the antennas.

In the sixth exemplary embodiment, the routed switch 23 outputs the sub-carrier signal of each one of input terminals to one of output terminals, multiple output terminals or none of the output terminals according to the control signal CS provided by the digital signal processing unit 25. Referring to FIG. 5A, in the sixth exemplary embodiment, the routed switch 23 has K input terminals and L output terminals, where K is 5 and L is 2. For example, if the sub-carriers aggregated by the multi-carrier transmitter 500 according to the carrier aggregation technique are all in the first band, i.e., only the RF signal in a first signal processing path of the fourth signal processing unit 22 has the sub-carriers, the routed switch 23 switches all of the input terminals to the first output terminal connected to the first signal processing path of the fourth signal processing unit 22 according to the control signal CS. Since there is no sub-carrier in the second band, the routed switch 23 does not switch any input terminal to the second output terminal connected to a second signal processing path of the fourth signal processing unit 22 according to the control signal CS.

According to FIG. 5A, it is known that a number of the signal processing paths of the third signal processing unit 24 determines a total number of the input terminals of the routed switch 23, and a number of the signal processing paths (two signal processing paths are illustrated in FIG. 5A) of the fourth signal processing unit 22 determines a total number of the output terminals of the routed switch 23. For example, if two of the sub-carriers aggregated by the multi-carrier transmitter 500 according to the carrier aggregation technique are in the first band, and three other sub-carriers are in the second band, the routed switch 23 can switch two input terminals connected to two signal processing paths of the third signal processing unit 24 to the first output terminal connected to the first signal processing path of the fourth signal processing unit 22, and switch the other three input terminals to the second output terminal connected to the second signal processing path of the fourth signal processing unit 22 according to the control signal CS.

The fourth signal processing unit 22 is coupled to the routed switch 23, and processes the received one or a plurality of sub-carrier signals through two independent and parallel signal processing paths. In detail, the fourth signal processing unit 22 has the first signal processing path including a filter 505, an oscillator 503, a mixer 504, an amplifier 502 and a filter 501. The filter 505 filters noises and other analog signals that are not belonging to the intermediate-frequency band (for example, 500 MHz). The mixer 504 is coupled to the filter 505 and the oscillator 503 for receiving the filtered analog signal, and up-converting the filtered analog signal according to a frequency signal provided by the oscillator 503 to generate a RF signal (for example, 1.8 GHz). The frequency-increased RF signal still includes one or a plurality of sub-carrier signals. The amplifier 502 is coupled to the mixer 504 and the filter 501, and is used for performing signal intensity enhancement (or voltage gain) processing to the one or a plurality of RF signals of such band. The filter 501 further filters noises of the RF signals that are not belonging to the first band (for example, 1.8 GHz), and outputs the gained RF signals to the antenna 20 for transmitting to the receiver.

Referring to FIG. 5A, the fourth signal processing unit 22 further has the second signal processing path including a filter 515, an oscillator 513, a mixer 514, an amplifier 512 and a filter 511. The filter 515, the oscillator 513, the mixer 514, the amplifier 512 and the filter 511 in the second signal processing path sequentially process one or a plurality of sub-carrier signals received from the routed switch 23 according to processing methods similarly to that of the filter 505, the oscillator 503, the mixer 504, the amplifier 502, and the filter 501, so as to filter, enhance and up-convert the sub-carrier signals, and output the gained RF signals to the antenna 21. Moreover, in the sixth exemplary embodiment, the fourth signal processing unit 22 is coupled to the antenna 20 and the antenna 21 for transmitting one or a plurality of the RF signals of two bands, and each RF signal can include one or a plurality of sub-carrier signals.

Figure 5B:
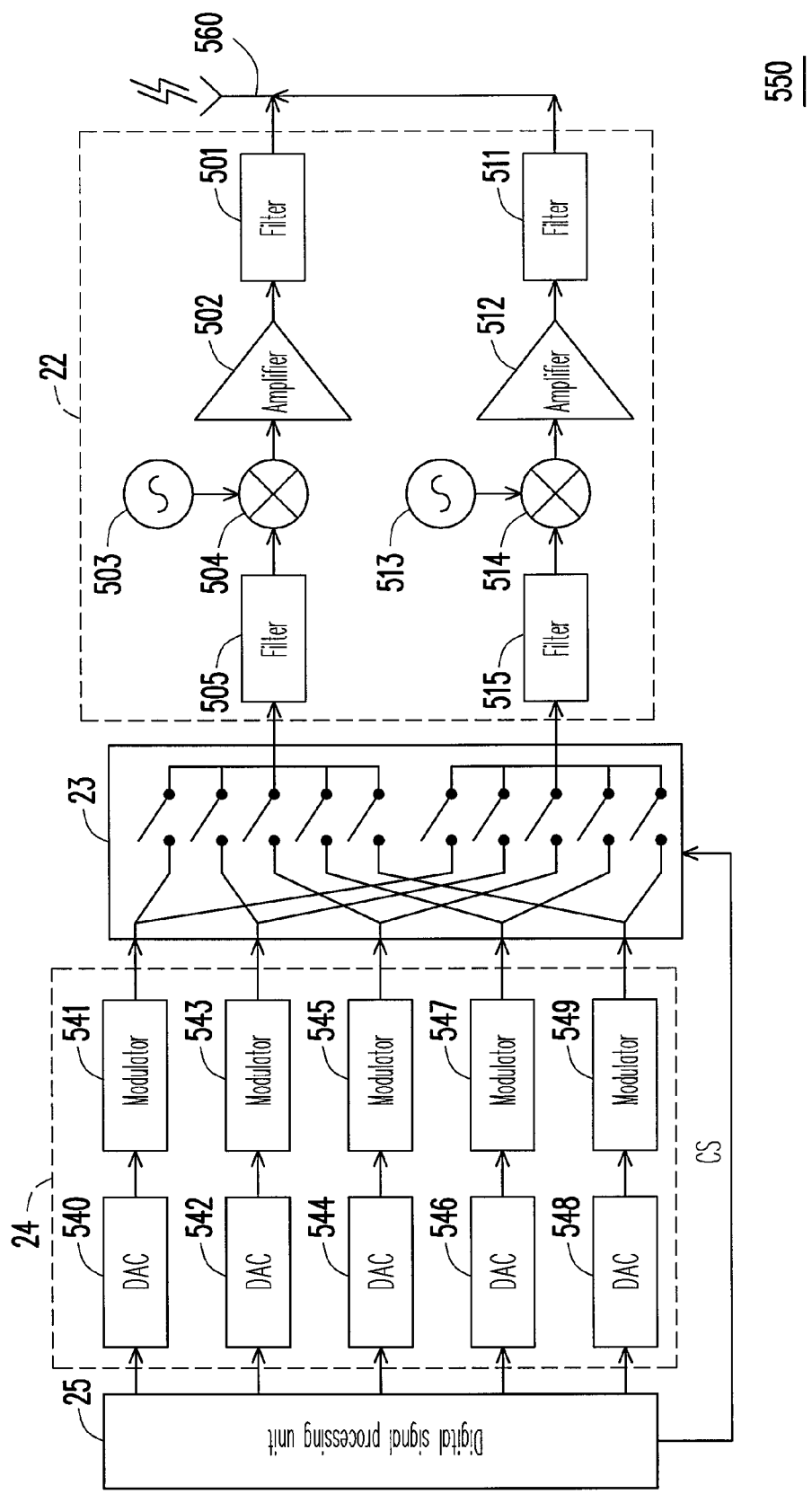
FIG. 5B is a system structural diagram illustrating a multi-carrier transmitter according to a seventh exemplary embodiment of the disclosure.

FIG. 5B is a system structural diagram illustrating a multi-carrier transmitter 550 according to a seventh exemplary embodiment of the disclosure. The multi-carrier transmitter 550 is similar to the multi-carrier transmitter 500, and a difference therebetween is that the multi-carrier transmitter 550 just has one antenna 560, and the antenna 560 has a bandwidth equal to a total bandwidth of the antenna 20 and the antenna 21, so that the two parallel signal processing paths of the fourth signal processing unit 22 of the seventh exemplary embodiment are all connected to the antenna 560, and the antenna 560 transmits the RF signals of two bands. However, the disclosure is not limited thereto, and in other exemplary embodiments of the disclosure, the multi-carrier transmitter can transmit RF signals of more than two bands through one broadband antenna.

Figure 5C:
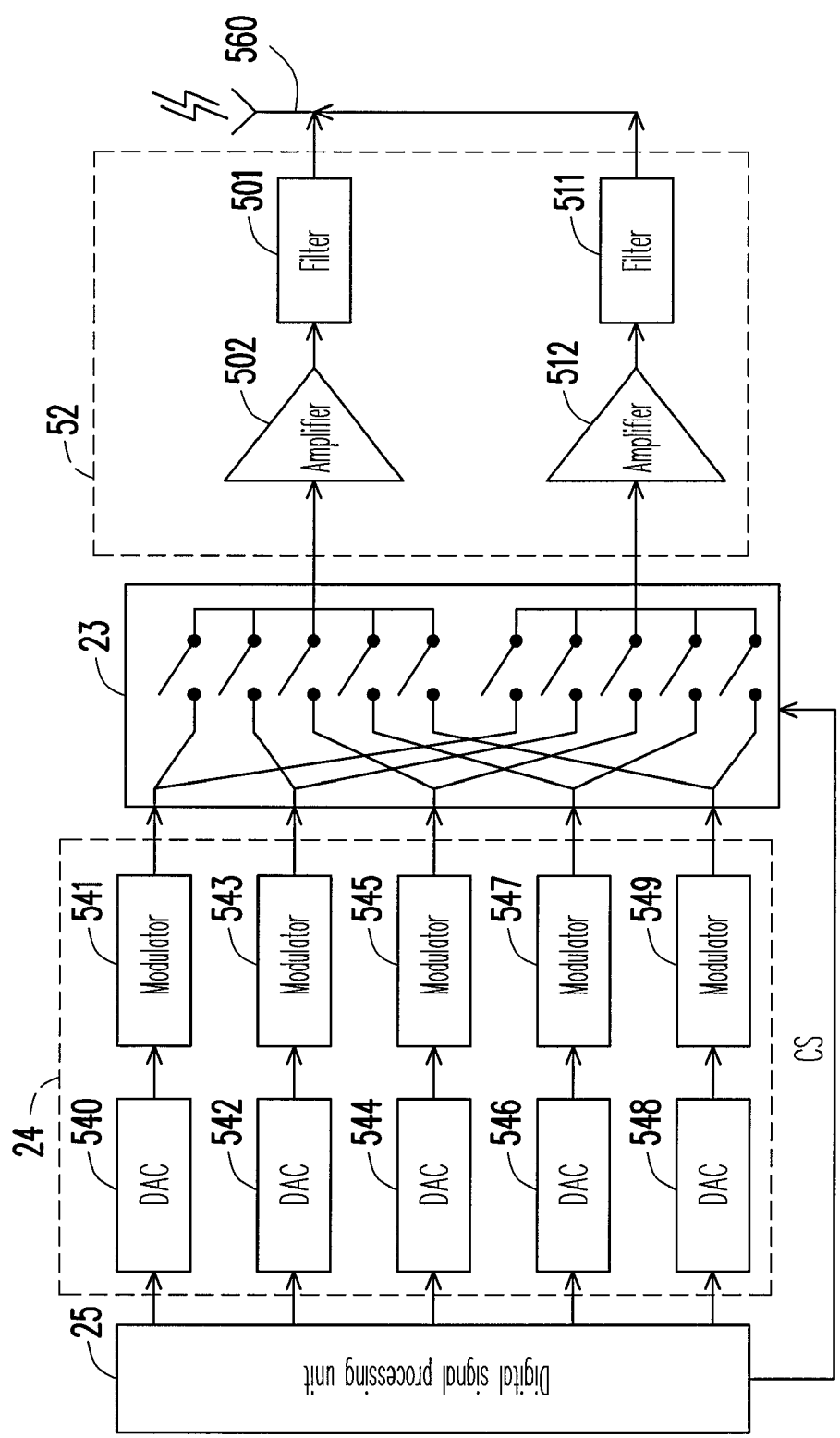
FIG. 5C is a system structural diagram illustrating a multi-carrier transmitter according to an eighth exemplary embodiment of the disclosure.

FIG. 5C is a system structural diagram illustrating a multi-carrier transmitter 570 according to an eighth exemplary embodiment of the disclosure. The multi-carrier transmitter 570 is similar to the multi-carrier transmitter 550, and a difference therebetween is that each one of the second signal processing paths of a fourth signal processing unit 52 of the multi-carrier transmitter 570 does not include the filter 505, the oscillator 503, the mixer 504, the filter 515, the oscillator 513 and the mixer 514. In other words, the fourth signal processing unit 52 of the multi-carrier transmitter 570 does not use the mixer 504 or the mixer 514 to up-convert the frequencies of the sub-carrier signals. In the eighth exemplary embodiment, each one of modulators (for example, the modulator 541, 543, 545, 527 or 549) of the third signal processing unit 24 can modulate low-frequency analog signals to generate high-frequency sub-carrier signals. After detailed components and functions of the components of the multi-carrier transmitter are introduced, complexity and bandwidth requirement of the multi-carrier transmitter or the multi-carrier receiver of the disclosure are compared to that of the conventional technique with reference of FIG. 6 and FIG. 7.

Figure 1:
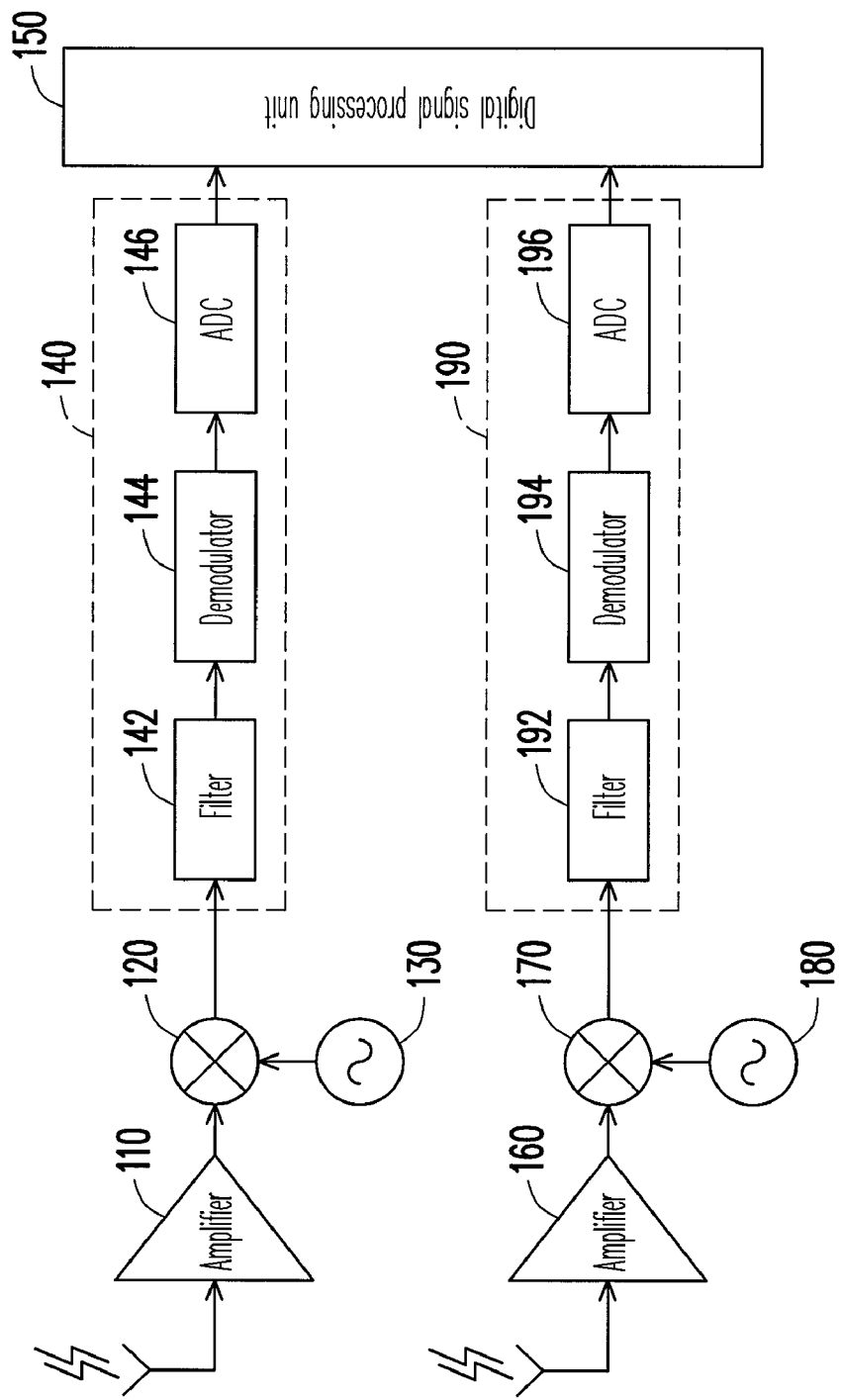
FIG. 1 is a functional block diagram illustrating a conventional multi-carrier receiver.
Figure 6:
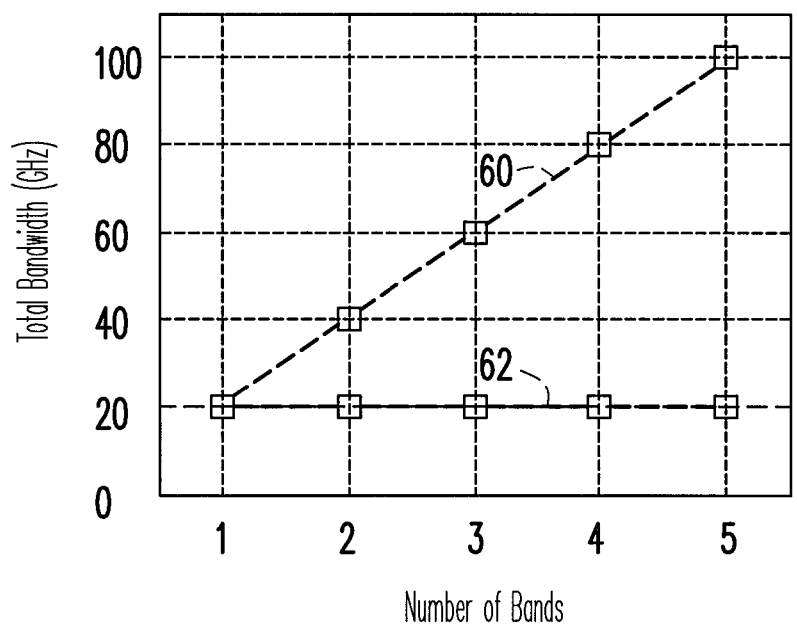
FIG. 6 is a comparison schematic diagram of total bandwidth requirements in system between the disclosure and the conventional technique.

FIG. 6 is a comparison schematic diagram of total bandwidth requirements in system between the disclosure and the conventional technique. FIG. 6 illustrates the total bandwidth requirement of the multi-carrier transmitter or the multi-carrier receiver of the disclosure when a number of the bands (i.e. a horizontal axis shown in FIG. 6) of the carrier aggregation is increased. In FIG. 6, it is assumed that a bandwidth of one band is at least 0.1 GHz, a bandwidth of each sub-carrier or each carrier component is 20 MHz, and a total number of the sub-carriers is 5. As shown in FIG. 6, a curve 60 represents that a total bandwidth of the conventional multi-carrier receiver 100 of FIG. 1 is linearly increased along with the number of the bands when the number of the bands is increased, this is because that under a most extreme condition, the multi-carrier receiver 100 has to preserve a maximum bandwidth for each one of signal processing paths, so that the total bandwidth requirement of the ADC (in the multi-carrier receiver 100) or the DAC (in the conventional multi-carrier transmitter) is also increased. Moreover, those skilled in the art should understand that the higher the bandwidth requirement of the ADC or the DAC is, the higher the hardware cost thereof is.

Comparatively, a curve 62 represents a bandwidth requirement of the multi-carrier receiver 200 provided by the first exemplary embodiment of FIG. 2. In the multi-carrier receiver 200, since the routed switch 13 can be used to dynamically switch each one of received sub-carrier signals to a single signal processing path having the DAC, even if the number of the bands is increased, each one of the signal processing paths (the second signal processing path) only requires a maximum bandwidth (which is fixed) of the sub-carrier or the carrier component. The above-described principle is also suitable for the total bandwidth requirements of the multi-carrier receivers provided by the second and the third exemplary embodiment of the disclosure, and the multi-carrier transmitters provided by the fourth, the fifth and the sixth exemplary embodiment of the disclosure.

Figure 7:
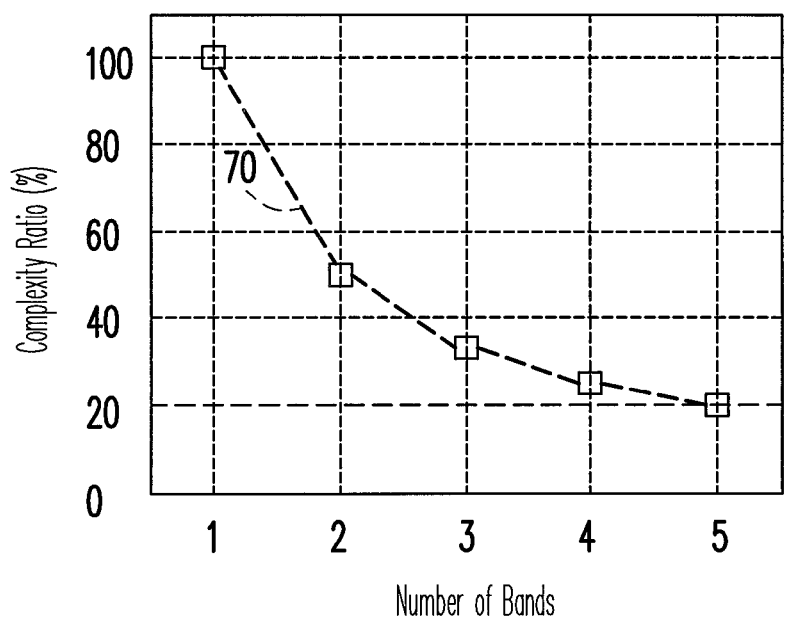
FIG. 7 is a schematic diagram illustrating a relationship between a system complexity and a number of bands of the disclosure.

FIG. 7 is a schematic diagram illustrating a relationship between the system complexity and the number of bands of the disclosure. A curve 70 in FIG. 7 represents that the complexity of the multi-carrier receiver 200 provided by the first exemplary embodiment of FIG. 2 is decreased as the number of the bands is increased. The so-called "complexity" is a ratio between a total bandwidth BW1 of the overall system of the multi-carrier receiver 200 and a total bandwidth BW2 of the overall system of the conventional multi-carrier receiver 100. The total bandwidth BW1 of the overall system of the multi-carrier receiver 200 is fixed, i.e., 0.1 GHz, but the total bandwidth BW2 of the overall system of the conventional multi-carrier receiver 100 is increased as the number of the bands is increased. For example, when the number of the bands is 5, the total bandwidth BW2 is 5×0.1 GHz=0.5 GHz. Therefore, the curve 70 presents a decreasing trend indicating that the complexity of the multi-carrier receiver 200 is decreased as the number of the bands is increased. The above principle is also suitable for the complexities of the multi-carrier receivers provided by the second and the third exemplary embodiment of the disclosure, and the multi-carrier transmitters provided by the fourth, the fifth and the sixth exemplary embodiment of the disclosure. After technical details of the multi-carrier transmitter and the multi-carrier receiver are introduced, technical details of a multi-carrier transceiver system are introduced below with reference of FIG. 8A-FIG. 8C.

Figure 8A:
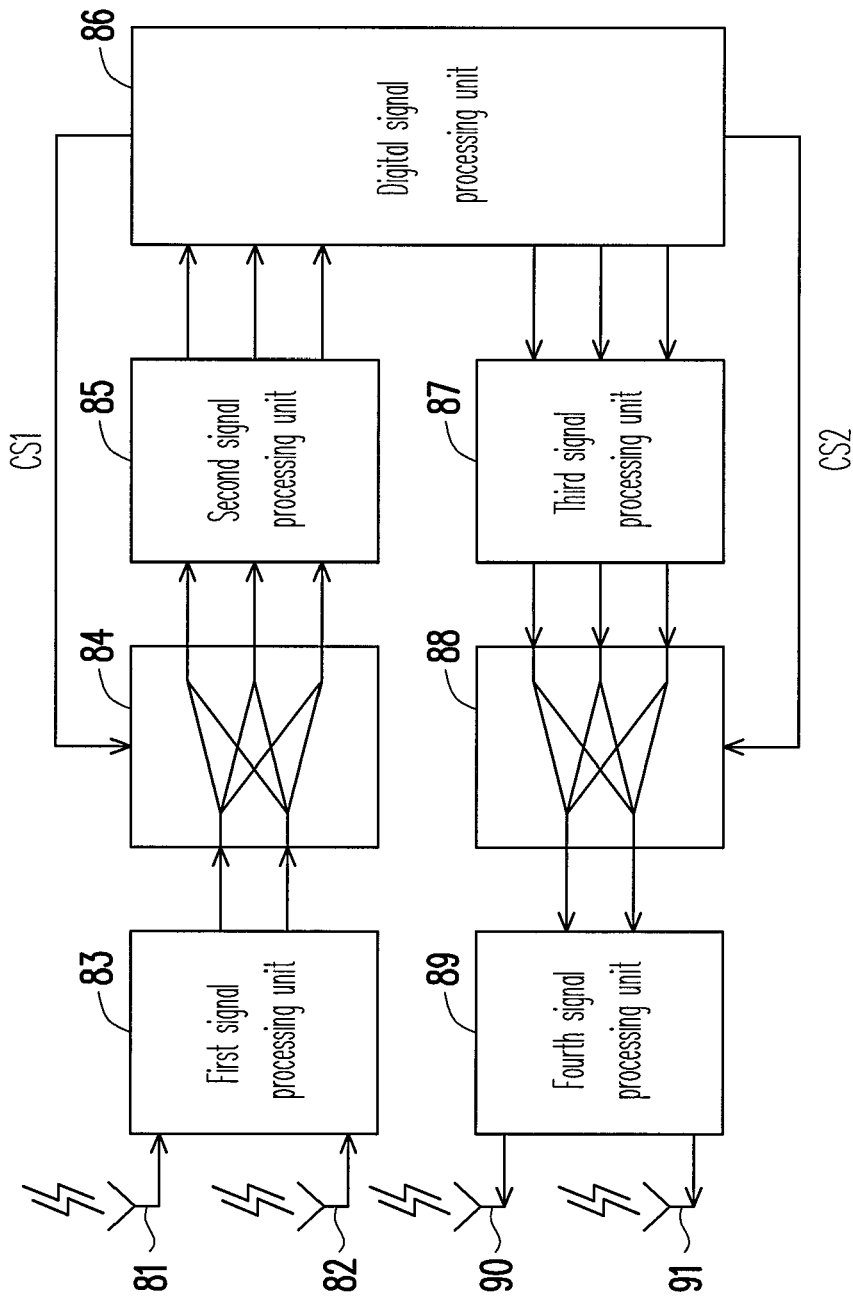
FIG. 8A is a system structural diagram illustrating a multi-carrier transceiver system according to a ninth exemplary embodiment of the disclosure.

FIG. 8A is a system structural diagram illustrating a multi-carrier transceiver system 800 according to a ninth exemplary embodiment of the disclosure. The multi-carrier transceiver system 800 includes a multi-carrier receiver and a multi-carrier transmitter. The multi-carrier receiver of the multi-carrier transceiver system 800 includes a first signal processing unit 83, a routed switch 84, a second signal processing unit 85, a digital signal processing unit 86, an antenna 81 and an antenna 82 used for receiving RF signals. The multi-carrier transmitter of the multi-carrier transceiver system 800 includes the digital signal processing unit 86, a third signal processing unit 87, a routed witch 88, a fourth signal processing unit 89, an antenna 90 and an antenna 91 used for transmitting RF signals.

Connection relations and operation principles of the antenna 81 and the antenna 82, the first signal processing unit 83, the routed switch 84, the second signal processing unit 85, the digital signal processing unit 86 of the multi-carrier transceiver system 800 are similar to that of the antenna 10 and the antenna 11, the first signal processing unit 12, the routed switch 13, the second signal processing unit 14 and the digital signal processing unit 15 of the multi-carrier receiver 200 of the first exemplary embodiment. Similarly, Connection relations and operation principles of the digital signal processing unit 86, the third signal processing unit 87, the routed switch 88, the fourth signal processing unit 89, the antenna 90 and the antenna 91 used for transmitting RF signals of the multi-carrier transceiver system 800 are similar to that of the digital signal processing unit 25, the third signal processing unit 24, the routed switch 23, the fourth signal processing unit 22, the antenna 20 and the antenna 21 of the multi-carrier transmitter 400 of the fourth exemplary embodiment. Besides that the digital signal processing unit 86 respectively provides control signals CS1 and CS2 to the routed switch 84 and the routed switch 88, other technical details of the multi-carrier transceiver system 800 are not introduced herein.

Figure 8B:
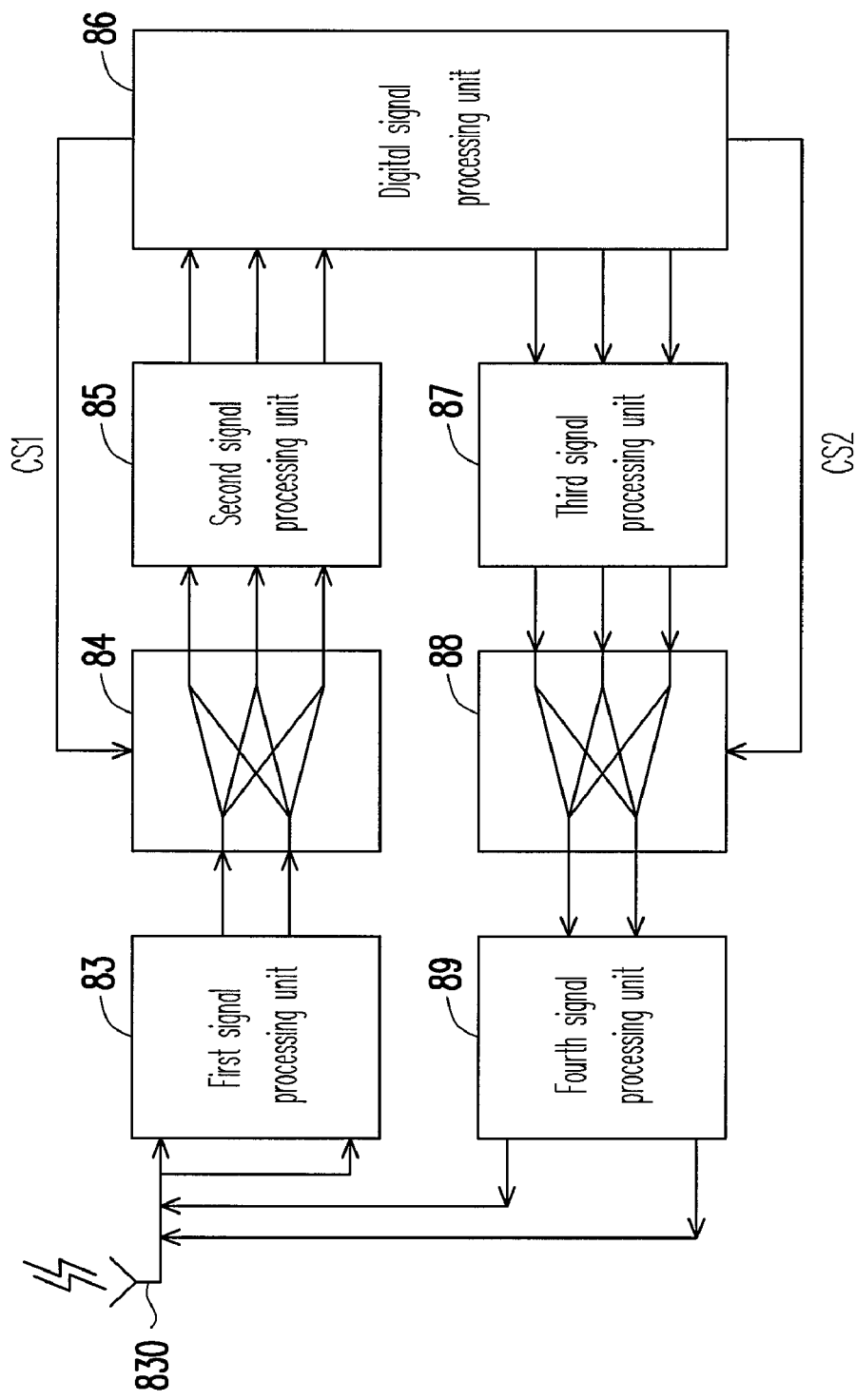
FIG. 8B is a system structural diagram illustrating a multi-carrier transceiver system according to a tenth exemplary embodiment of the disclosure.

FIG. 8B is a system structural diagram illustrating a multi-carrier transceiver system 820 according to a tenth exemplary embodiment of the disclosure. The multi-carrier transceiver system 820 is similar to the multi-carrier transceiver system 800, and a difference therebetween is that the multi-carrier transceiver system 820 just has one antenna 830 for receiving and transmitting RF signals, and the antenna 830 has a bandwidth equal to a total bandwidth of the antenna 81, the antenna 82, the antenna 90 and the antenna 91.

Figure 8C:
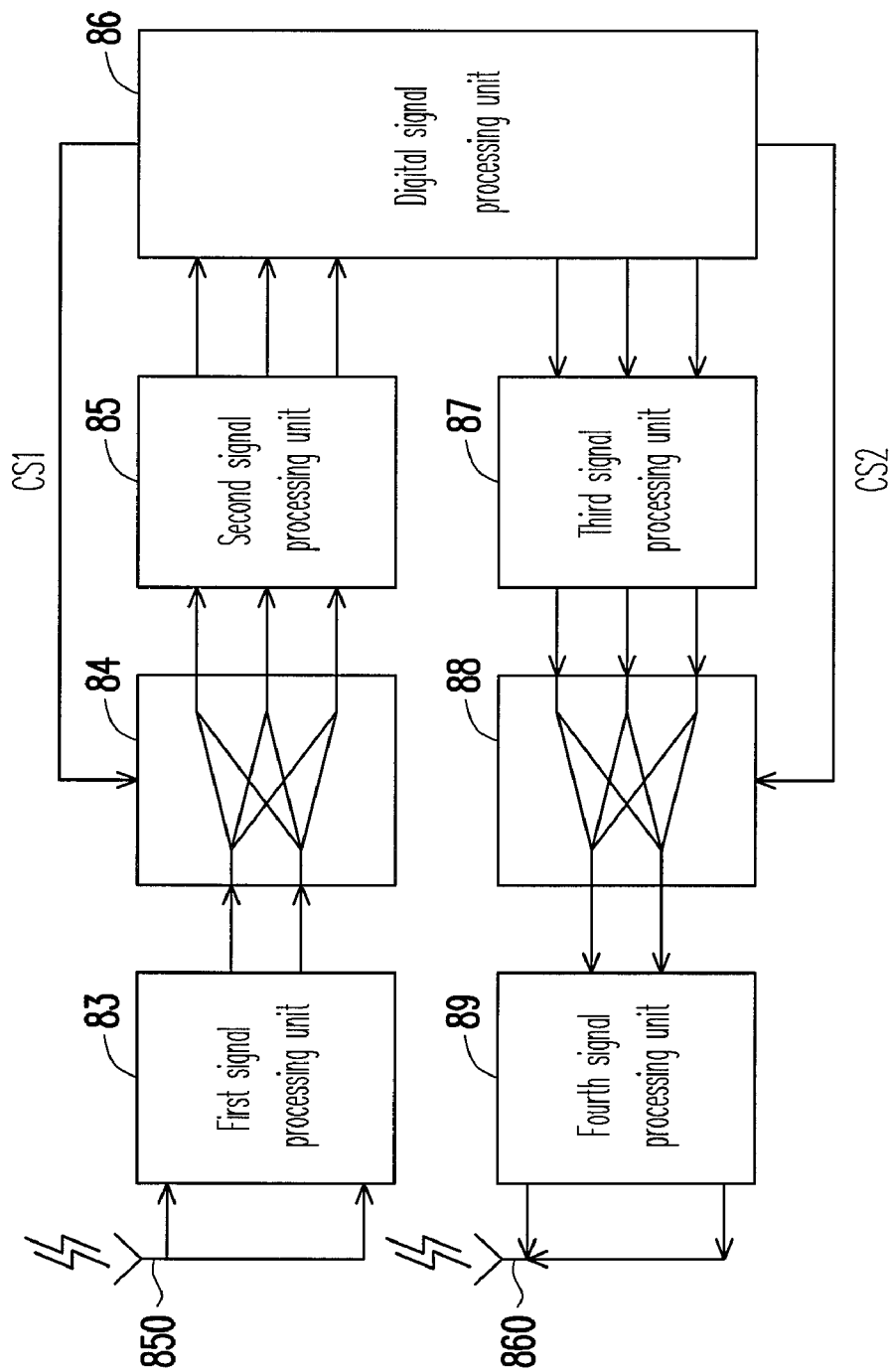
FIG. 8C is a system structural diagram illustrating a multi-carrier transceiver system according to an eleventh exemplary embodiment of the disclosure.

FIG. 8C is a system structural diagram illustrating a multi-carrier transceiver system 840 according to an eleventh exemplary embodiment of the disclosure. The multi-carrier transceiver system 840 is similar to the multi-carrier transceiver system 800, and a difference therebetween is that the multi-carrier transceiver system 840 just has one antenna 850 for receiving RF signals and one antenna 860 for transmitting the RF signals. The antenna 850 has a bandwidth equal to a total bandwidth of the antenna 81 and the antenna 82, and the antenna 860 has a bandwidth equal to a total bandwidth of the antenna 90 and the antenna 91.

The multi-carrier receivers, the multi carrier transmitters and the multi-carrier transceiver systems provided by the exemplary embodiments of the disclosure can be applied to a wireless communication device, and the wireless communication device is, for example, a digital television, a digital set-top box (STB), a desk-top computer, a notebook computer, a flat-panel computer, a mobile phone, a smartphone, an electronic book or a multimedia player.

In summary, the exemplary embodiments of the disclosure provide a multi-carrier receiver, a multi-carrier transmitter and a multi-carrier transceiver system. In the multi-carrier receiver or the multi-carrier transmitter, the signal processing units of two stages are used to process the RF signals and the sub-carrier signals therein. Moreover, between the signal processing units of the two stages, the routed switch is used to dynamically allocate different sub-carrier signals to independent and parallel signal processing paths, so as to reduce bandwidth requirements of the parallel signal processing paths, and lower complexity and hardware cost of the multi-carrier receiver or the multi-carrier transmitter. Moreover, hardware idle rate and power consumption can also be reduced, and an effect of simultaneously processing multiple non-contiguous sub-carrier signals can be achieved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A multi-carrier receiver, comprising:
 a first signal processing unit, having M first signal processing paths, and configured for performing a first signal processing to at least one radio frequency (RF) signal for outputting at least one sub-carrier signal, wherein the at least one RF signal is the aggregation of the at least one sub-carrier signal and is adjusted by a carrier aggregation technique dynamically, wherein the sub-carrier signals are non-contiguous and M is greater than 0;

a routed switch, having M input terminals and N output terminals, wherein the M input terminals are respectively coupled to the M first signal processing paths of the first signal processing unit for receiving the at least one sub-carrier signal, the routed switch dynamically switches the at least one sub-carrier signal to independent and parallel signal processing paths, and the routed switch connects each one of the input terminals to at least one of the output terminals or none of the output terminals according to a control signal, wherein N is greater than 0; and a second signal processing unit, having N second signal processing paths respectively coupled to the N output terminals of the routed switch, for performing a second signal processing to the at least one sub-carrier signal and outputting at least one digital signal.

2. The multi-carrier receiver as claimed in claim 1, further comprising:
at least one antenna, configured for receiving the at least one RF signal; and
a digital signal processing unit, coupled to the second signal processing unit, configured for receiving the at least one digital signal, performing a digital signal processing to the at least one digital signal, and providing the control signal to the routed switch,
wherein the first signal processing unit further performs a filtering processing and a voltage enhancement processing to the at least one RF signal.

3. The multi-carrier receiver as claimed in claim 1, wherein each one of the first signal processing path of the first signal processing unit comprises:
a first filter, configured for filtering noise of one of the at least one RF signal that is not belonging to a band of the first signal processing path;
an amplifier, coupled to the first filter, configured for enhancing one of the at least one RF signal;
an oscillator, configured for providing a frequency signal;
a mixer, coupled to the oscillator and the amplifier, configured for receiving the enhanced one of the at least one RF signal, down-converting a frequency of one of the at least one RF signal, and generating the at least one down-converted sub-carrier signal; and
a second filter, coupled to the mixer, configured for filtering noise of the at least one sub-carrier signal that is not belonging to a down-converted intermediate frequency band.

4. The multi-carrier receiver as claimed in claim 3, wherein each one of the second signal processing paths of the second signal processing unit comprises:
a demodulator, for performing a demodulation processing to one of the at least one down-converted sub-carrier signal, and generating a demodulated analog signal; and
an analog-to-digital converter, coupled to the demodulator, configured for performing an analog-to-digital conversion to the analog signal to generate one of the at least one digital signal.

5. The multi-carrier receiver as claimed in claim 4, further comprising:
at least one antenna, configured for receiving the a least one RF signal; and
a digital signal processing unit, coupled to the second signal processing unit, configured for receiving the at least one digital signal, performing a digital signal processing to the at least one digital signal, and providing the control signal to the routed switch.

6. The multi-carrier receiver as claimed in claim 1, wherein each first signal processing path of the first signal processing unit comprises:
a first filter, configured for filtering noise of one of the at least one RF signal that is not belonging to a band of the first signal processing path; and
an amplifier, coupled to the first filter, configured for performing a signal intensity processing to one of the at least one RF signal.

7. The multi-carrier receiver as claimed in claim 6, wherein each one of the second signal processing paths of the second signal processing unit comprises:
a demodulator, configured for performing a demodulation processing to one of the at least one sub-carrier signal, and generating a demodulated analog signal; and
an analog-to-digital converter, coupled to the demodulator, configured for performing an analog-to-digital conversion to the analog signal to generate one of the at least one digital signal.

8. The multi-carrier receiver as claimed in claim 7, further comprising:
at least one antenna, configured for receiving the a least one RF signal; and
a digital signal processing unit, coupled to the second signal processing unit, configured for receiving the at least one digital signal, performing a digital signal processing to the at least one digital signal, and providing the control signal to the routed switch.

9. A multi-carrier transmitter, comprising:
a first signal processing unit, having K first signal processing paths, and configured for performing a first signal processing to at least one digital signal for outputting at least one sub-carrier signal, wherein the at least one digital signal is the aggregation of the at least one sub-carrier signal and is adjusted by a carrier aggregation technique dynamically, wherein the sub-carrier signals are non-contiguous, wherein K is greater than 0;
a routed switch, having K input terminals and L output terminals, wherein the K input terminals are respectively coupled to the K first signal processing paths of the first signal processing unit for receiving the at least one sub-carrier signal, the routed switch dynamically switches the at least one sub-carrier signal to independent and parallel signal processing paths, and the routed switch connects each one of the input terminals to at least one of the output terminals or none of the output terminals according to a control signal, wherein L is greater than 0; and
a second signal processing unit, having L second signal processing paths respectively coupled to the L output terminals of the routed switch, configured for performing a second signal processing to the at least one sub-carrier signal and outputting at least one radio frequency (RF) signal.

10. The multi-carrier transmitter as claimed in claim 9, further comprising:
a digital signal processing unit, coupled to the first signal processing unit, configured for providing the at least one digital signal to the first signal processing unit, and providing the control signal to the routed switch; and
at least one antenna, for transmitting the at least one RF signal, wherein the at least one RF signal comprises the at least one sub-carrier signal, wherein the second signal processing unit further performs a filtering processing and a voltage enhancement processing to the at least one sub-carrier signal.

11. The multi-carrier transmitter as claimed in claim 9, wherein each one of the first signal processing paths of the first signal processing unit comprises:
a digital-to-analog converter, coupled to the digital signal processing unit, configured for performing a digital-to-analog conversion to one of the at least one digital signal to generate an analog signal; and
a modulator, configured for performing a modulation processing to the analog signal, and generating one of the at least one modulated sub-carrier signal.

12. The multi-carrier transmitter as claimed in claim 11, wherein each one of the second signal processing paths of the second signal processing unit comprises:
a first filter, configured for filtering noise of the at least one sub-carrier signal that is not belonging to an intermediate frequency band of the second signal processing path;
an oscillator, configured for providing a frequency signal;
an amplifier, coupled to the first filter, configured for enhancing the at least one RF signal;
a mixer, coupled to the oscillator and the amplifier, configured for receiving the at least one filtered sub-carrier signal and the frequency signal, up-converting a frequency of the at least one sub-carrier signal, and generating the at least one frequency-increased RF signal; and
a second filter, coupled to the amplifier, configured for filtering noise of the at least one gained RF signal that is not belonging to a band of the second signal processing path.

13. The multi-carrier transmitter as claimed in claim 12, further comprising:
a digital signal processing unit, coupled to the first signal processing unit, configured for providing the at least one digital signal to the first signal processing unit, and providing the control signal to the routed switch; and
at least one antenna, for transmitting the at least one RF signal, wherein the at least one RF signal comprises the at least one sub-carrier signal.

14. The multi-carrier transmitter as claimed in claim 11, wherein each one of the second signal processing paths of the second signal processing unit comprises:
an amplifier, coupled to the first filter, configured for enhancing one of the at least one RF signal; and
a filter, coupled to the amplifier, configured for filtering noise of the at least one gained RF signal that is not belonging to a band of the second signal processing path.

15. The multi-carrier transmitter as claimed in claim 14, further comprising:
a digital signal processing unit, coupled to the first signal processing unit, configured for providing the at least one digital signal to the first signal processing unit, and providing the control signal to the routed switch; and
at least one antenna, for transmitting the at least one RF signal, wherein the at least one RF signal comprises the at least one sub-carrier signal.

16. A multi-carrier transceiver system, comprising:
a multi-carrier receiver, comprising:
a first signal processing unit, having M first signal processing paths, and configured for performing a first signal processing to at least one first radio frequency (RF) signal for outputting at least one first sub-carrier signal, wherein the at least one first RF signal is the aggregation of the at least one sub-carrier signal and is adjusted by a carrier aggregation technique dynamically, wherein the sub-carrier signals are non-contiguous and M is greater than 0;
a first routed switch, having M input terminals and N output terminals, wherein the M input terminals are respectively coupled to the M first signal processing paths of the first signal processing unit for receiving the at least one first sub-carrier signal, the routed switch dynamically switches the at least one sub-carrier signal to independent and parallel signal processing paths, and the first routed switch connects each one of the input terminals to at least one of the output terminals or none of the output terminals according to a first control signal, wherein N is greater than 0; and
a second signal processing unit, having N second signal processing paths respectively coupled to the N output terminals of the first routed switch, configured for performing a second signal processing to the at least one first sub-carrier signal and outputting at least one first digital signal; and
a multi-carrier transmitter, configured for transmitting at least one second sub-carrier signal.

17. The multi-carrier transceiver system as claimed in claim 16, wherein the multi-carrier receiver further comprises:
at least one first antenna, configured for receiving the at least one first RF signal,
wherein the first signal processing unit further performs a filtering processing and a voltage enhancement processing to the at least one first RF signal.

18. The multi-carrier transceiver system as claimed in claim 16, wherein the second signal processing of the second signal processing unit comprises a demodulation processing and an analog-to-digital conversion.

19. The multi-carrier transceiver system as claimed in claim 16, wherein the multi-carrier transmitter comprises:
a third signal processing unit, having K third signal processing paths, and configured for performing a third signal processing to at least one second digital signal for outputting at least one second sub-carrier signal, wherein K is greater than 0;
a second routed switch, having K input terminals and L output terminals, wherein the K input terminals are respectively coupled to the K third signal processing paths of the third signal processing unit for receiving the at least one second sub-carrier signal, and the second routed switch connects each one of the input terminals to at least one of the output terminals or none of the output terminals according to a second control signal, wherein L is greater than 0; and
a fourth signal processing unit, having L fourth signal processing paths respectively coupled to the L output terminals of the second routed switch, configured for performing a fourth signal processing to the at least one second sub-carrier signal and outputting at least one second RF signal, wherein the at least one second RF signal comprises the at least one second sub-carrier signal.

20. The multi-carrier transceiver system as claimed in claim 19, wherein the multi-carrier transmitter further comprises:
at least one second antenna, for transmitting the at least one second RF signal,
wherein the fourth signal processing unit further performs a filtering processing and a voltage enhancement processing to the at least one second sub-carrier signal.

21. The multi-carrier transceiver system as claimed in claim 19, wherein the third signal processing of the third signal processing unit comprises a digital-to-analog conversion and a modulation processing.

22. The multi-carrier transceiver system as claimed in claim 19, further comprising:

a digital signal processing unit, coupled to the second signal processing unit and the third signal processing unit, configured for receiving the at least one first digital signal, performing a digital signal processing to the at least one first digital signal, providing the first control signal to the first routed switch, providing the at least one second digital signal to the third signal processing unit, and providing the second control signal to the second routed switch.

* * * * *